United States Patent
Gerstenberger et al.

[11] Patent Number: 5,605,380
[45] Date of Patent: Feb. 25, 1997

[54] SEAT BELT ADJUSTER

[75] Inventors: Paul J. Gerstenberger; Marcus Gerstenberger, both of Longmont; James Rupp, Boulder, all of Colo.

[73] Assignee: Child Safe International, LLC, Boulder, Colo.

[21] Appl. No.: 557,938

[22] Filed: Nov. 14, 1995

[51] Int. Cl.⁶ ............ A47D 15/00; B60R 22/00; B60R 22/12
[52] U.S. Cl. ............ 297/483; 24/170; 24/198
[58] Field of Search ............ 297/483; 24/302, 24/170, 198, 199

[56]  References Cited

U.S. PATENT DOCUMENTS

| | | | |
|---|---|---|---|
| 2,224,773 | 12/1940 | Shaulson | 24/199 |
| 3,790,209 | 2/1974 | Littmann | 297/483 |
| 3,866,975 | 2/1975 | Fricko | 297/483 |
| 4,236,755 | 12/1990 | Pollitt et al. | 297/483 |
| 4,832,367 | 5/1989 | Lisenby . | |
| 5,135,257 | 8/1992 | Short | 297/483 |
| 5,169,174 | 12/1992 | Gray . | |
| 5,201,099 | 4/1993 | Campbell . | |
| 5,403,038 | 4/1995 | McFalls | 297/483 |
| 5,443,302 | 8/1995 | Dybro | 297/483 |

FOREIGN PATENT DOCUMENTS 9321044  10/1993  WIPO .

*Primary Examiner*—Peter M. Cuomo
*Assistant Examiner*—Anthony D. Barfield

[57]  ABSTRACT

A seat belt adjuster is provided for holding the shoulder belt to the lap belt of an automotive seat belt at a fixed distance to create a compound angle of assent of the shoulder belt to prevent it from crossing the occupant's face or neck. The adjuster is an assembly of three components; a shoulder belt clip, lap belt locking buckle, and a tether. The shoulder belt clip is tethered to the lap belt locking buckle pulling the shoulder belt closer to the lap. The lap belt locking buckle can slide along the lap belt for adjustment and then be locked into position by closing the locking arm of the buckle.

1 Claim, 7 Drawing Sheets

SEAT BELT ADJUSTER

FIELD OF INVENTION

The present invention relates to an automobile seat belt adjuster which provides for the shoulder strap to be adjusted away from a child's face.

BACKGROUND OF THE INVENTION

Conventional three-point automobile seat belts are normally provided with one continuous strap and a latch plate. When the strap is pulled around the body, it essentially divides into two components, the waist strap and the shoulder strap. The latch plate fastens to a catch secured to a side of the automobile seat. When the latch plate is fastened to the catch, the waist strap is wrapped around the waist to prevent the individual from being dislodged from the seat in the event of a collision. The shoulder strap is wrapped from the side of the waist across the chest and over the opposite shoulder to prevent the individual's upper torso from being thrown forward.

Conventional automotive seat belts are well designed for use by adults of normal height. However, these seat belts are not well suited for individuals who are very short in height, especially children who have outgrown conventional restraining devices, such as car seats. When a conventional three-point seat belt is fastened in place by a child, the waist strap portion sits properly to securely hold the child's lower body in the seat. However, the shoulder strap portion will typically extend across the child's neck or face because the position of the rear delivery ring has been designed for individuals with larger torsos. This discomfort often leads to the shoulder belt being placed behind the back or worse yet, the entire belt may not be used leading to serious injury or death in a collision.

Devices which have been made for attaching to the lap belt have a hook to capture and adjust the shoulder belt. One example of such a device is shown in U.S. Pat. No. 5,201,099 to Campbell. The buckle uses a one piece unit with an integral hook that connects a portion of the shoulder strap to the buckle moving the shoulder strap away from the neck and face. This, unfortunately, results in the shoulder strap base being moved from the side of the hip opposite to the supported shoulder to the hip on the same side. The shoulder belt takes a vertical rise from hip to shoulder creating imbalanced support in a collision. FIG. 1 shows how the upper torso could slip past the shoulder belt using the Campbell device.

The present invention solves this problem of slipping past the shoulder belt by adding a tether upward from an auxiliary lap belt buckle. The tether supports a shoulder belt fastening clip. The shoulder belt fastening clip pulls the shoulder belt in a compound angle away from the user's face as seen in FIG. 2. The user's upper torso is still well protected by the shoulder belt. Additionally, the shoulder belt is held flat against the user's upper torso rather than twisted sideways as with the Campbell device.

SUMMARY OF TEE INVENTION

The main object of the present invention is to provide a seat belt adjuster that moves the shoulder belt away from the user's face while sill providing adequate protection to the user's torso.

Other objects of this invention will appear from the following description and appended claims, reference being made to the accompanying drawings forming a part of this specification wherein like reference characters designate corresponding parts in the several views.

The present invention relates to a seat belt adjuster for the manner in which the shoulder belt covers the torso of a child or small adult.

A shoulder belt typically extends from a seat belt retractor through a belt guide (D-ring) mounted on a pillar of the vehicle and downward across the shoulder and abdomen of the vehicle occupant to a catch buckle mounted to the seat. The (most often fixed) location of the D-ring and catch buckle determines the angle at which the shoulder belt extends across the occupant's torso. The D-ring's location is most often incompatible with small children without some modification. It is the intent of this invention to adjust the crossing pattern without modifying or invading any component of the original manufacturer's restraint system.

The present invention provides a novel seat belt adjuster which controls a compound angle for the overlay of the shoulder strap. The shoulder belt is fastened to the auxiliary lap belt buckle to pull it away from the face and neck. The shoulder belt holding clip is offset from the auxiliary lap belt buckle providing stable support for both the upper and lower torso. Although the shoulder belt holding clip is secured to the auxiliary lap belt buckle by a tether at a fixed distance from the buckle, the buckle can slide along the lap belt creating adjustability. After finding the appropriate position for the auxiliary lap belt buckle, hence the shoulder strap overlay, it can be locked into place.

The embodiment of the seat belt adjuster comprises an assembly of three components; a shoulder belt fastening clip, a lap belt locking buckle, and a clip to buckle tether.

The shoulder belt clip is a solid piece of material which has been slotted to permit fastening to (most common) two inch seat belt fabric and has a half circle slot in the base to create a D-ring for tethering the shoulder belt clip to the lap belt locking buckle. The purpose of the D-ring slot is to allow the shoulder belt clip to self-align (commensurate with the shape required by the seat belt fabric to prevent twisting) to each position set by the lap belt locking buckle.

The clip to buckle tether connects the shoulder belt clip to the lap belt locking buckle which pulls the shoulder belt fabric down and off the face or neck of the vehicle occupant (child). The tether is a sewn loop made of one inch woven belt webbing.

The lap belt locking buckle is a two-piece assembly comprising a body and locking arm. The locking arm snaps into the body and is not designed to be easily removed. An H-slot is cut into the body of the buckle to allow the two-inch seat belt fabric to fasten to the buckle body. The H-slot holds to the seat belt fabric and allows the buckle body to slide (translate) along the seat belt fabric when the locking arm is in the up (unlocked) position. The locking arm contains a cam shape that compresses the seat-belt fabric against the lap belt locking buckle body. Closing the locking arm prevents any further sliding of the buckle position on the seat belt fabric.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
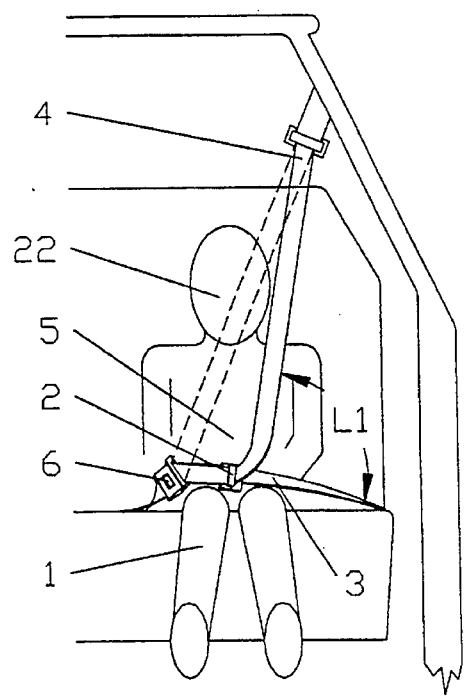
FIG. 1 (Prior Art) is a diagrammatic depiction of the degradation of the restraint belt geometry by a conventional lap-belt clip.

Referring first to FIG. 1 the child 1 is using a conventional one-piece buckle-type adjuster 2. A clip holds the shoulder strap 4 to the one-piece buckle 2 mounted on the waist belt 3. The user's upper torso 5 can easily slip past the shoulder strap 4, thereby losing the full protection of the shoulder belt 4. Even when the one-piece buckle 2 is in the optimal position, the angle $L_1$ is too big to allow the shoulder strap 4 to lie flat. It tends to curl, thereby losing more of the protection of the original design. The conventional latch plate and buckle assembly 6 holds the waist and shoulder straps to the automobile seat.

Figure 2:
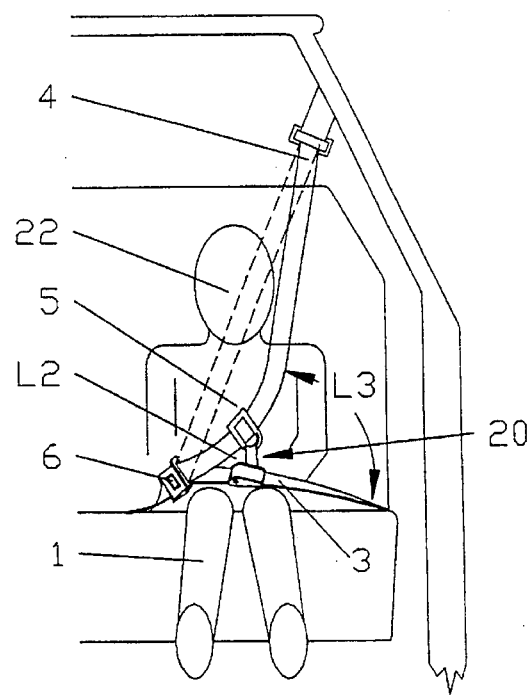
FIG. 2 is a diagrammatic depiction of the compound angle assumed by the restraint belt using the present invention.

Referring next to FIG. 2 the same waist and shoulder belts have been equipped with the tethered adjuster 20 (the preferred embodiment). The shoulder strap 4 is now held in a compound angle as represented by L2 and L3. Each of these angles L2 and L3 are smaller than angle L1 of FIG. 1. Thus, the shoulder strap 4 is adjusted away from the user's face 22 while providing full protection of the user's torso 5. The shoulder strap 4 lies flat. The user 1 does not have the tendency to move the tethered adjuster 20 too far to his left where it would compromise the safety of the shoulder strap.

Figure 3:
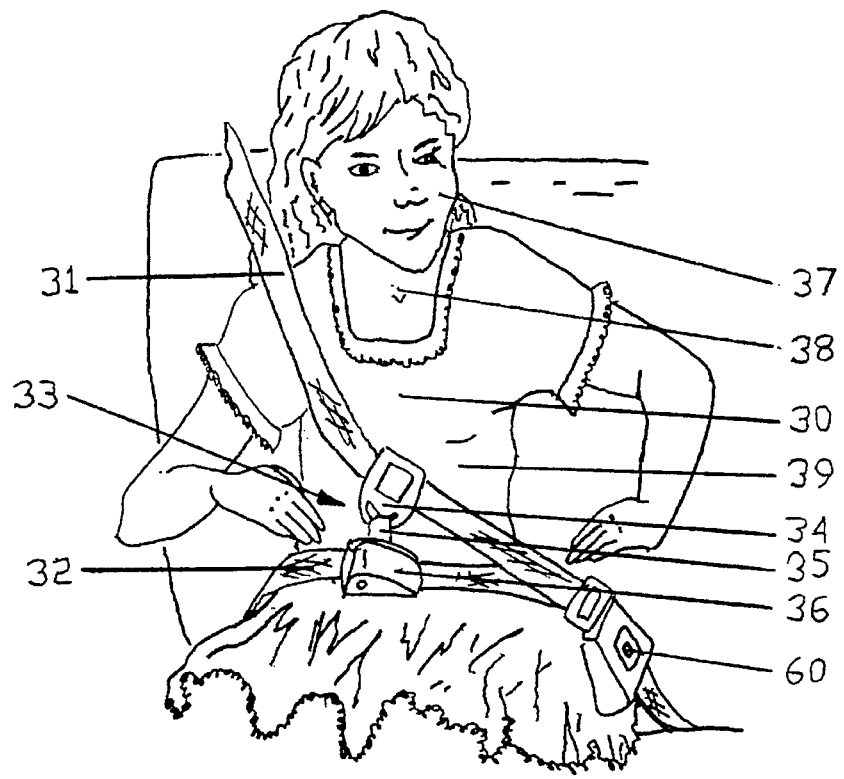
FIG. 3 is a perspective view showing how the seat belt adjuster of the present invention may be used by a child in a fastened three-point seat belt.

Referring next to FIG. 3 the child 30 is clipping the latch plate and buckle assembly 60 shut. The tethered adjuster 33 is comprised of an auxiliary belt buckle 36, a tether 35, and a shoulder clip 34. The auxiliary belt buckle 36 has been locked into the desired position along the waist belt 32 to keep the shoulder strap 31 out of the face 37 of the child 30. Both the upper torso 38 and lower torso 39 are protected by the shoulder strap 31 overlay and the shoulder portion is lying flat.

Figure 4:
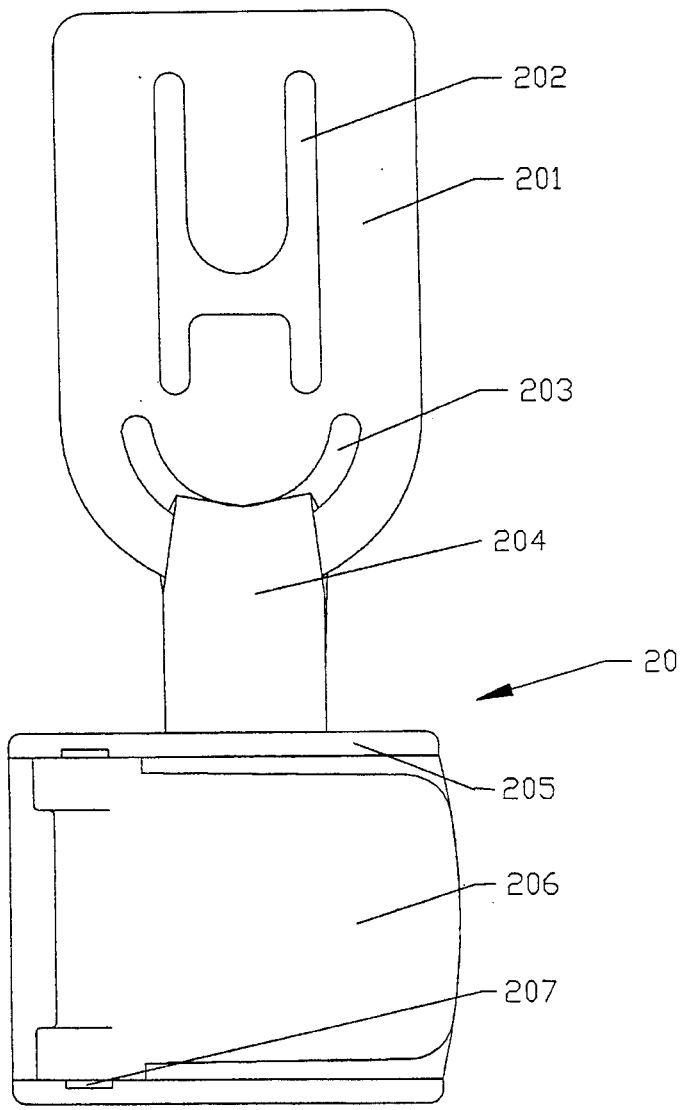
FIG. 4 is a front plan view of the preferred embodiment.

Referring next to FIG. 4 the tethered adjuster 20 is comprised of an auxiliary belt buckle 205 which has a locking lever 206 pivotal around hinge pin 207. A tether 204 is permanently fastened to the auxiliary belt buckle 205 and the slot 203 of shoulder clip 201. The shoulder clip 201 has an H cutout 202 for mounting to a shoulder strap.

Figure 5:
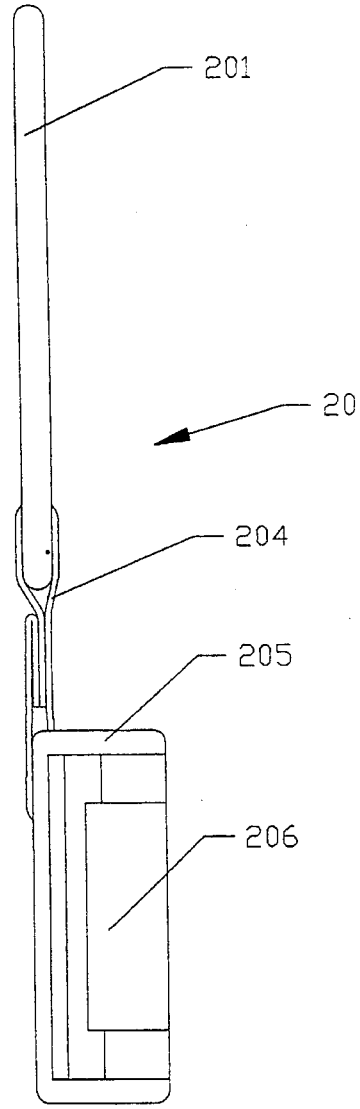
FIG. 5 is a left side plan view of the embodiment shown in FIG. 4.

Referring next to FIG. 5 the tethered adjuster 20 has the tether 204 affixed to itself to form a continuous loop threaded through a slot 211 in the auxiliary belt buckle 205. See FIG. 7.

Figure 6:
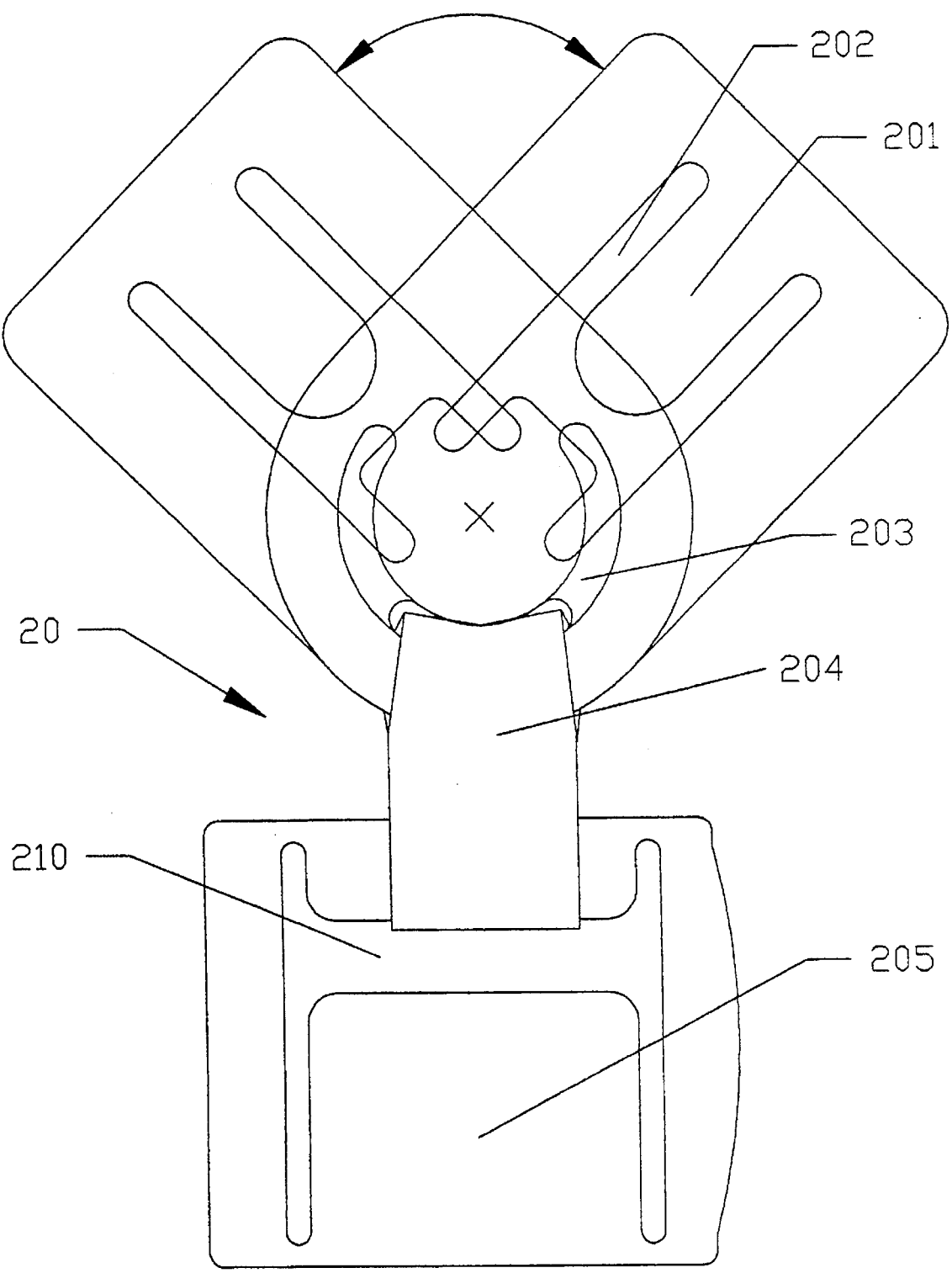
FIG. 6 is a back side plan view of the embodiment shown in FIG. 4.

Referring next to FIG. 6 it can be seen how slot 203 of shoulder clip 201 provides for rotation about tether 204 further assisting the shoulder strap to lie flat as shown in FIG. 3. The H cutout 210 of the auxiliary belt buckle 205 provides for the mounting of the waist belt as shown in FIGS. 8, 9, 10.

Figure 7:
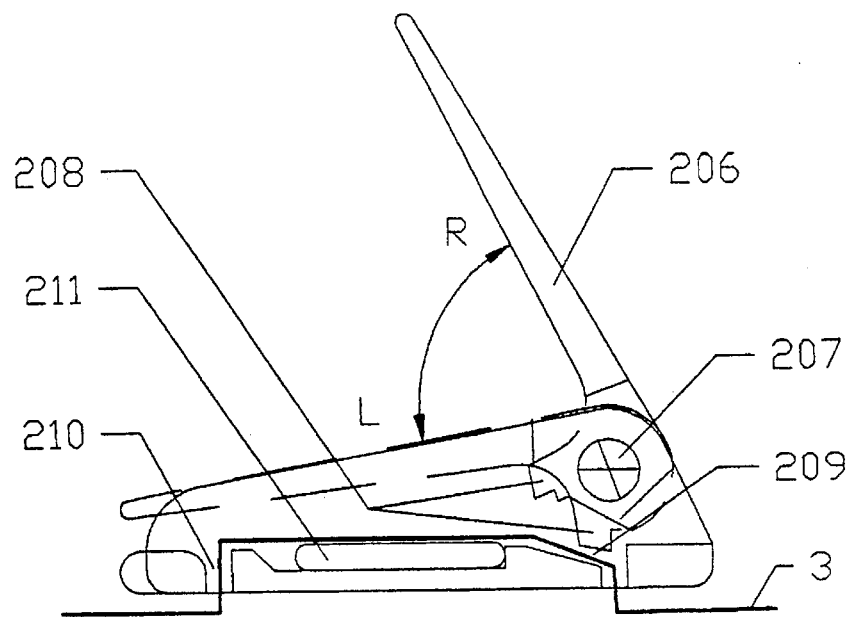
FIG. 7 is a bottom side plan view of the auxiliary belt buckle shown in FIG. 4 showing the open and closed position of the locking arm fastened to the waist belt.

Referring next to FIG. 7 the waist belt 3 is shown mounted in the H cutout 210 of the auxiliary belt buckle 205. The locking lever 206 has a locking tongue 208 which fits into groove 209 to lock the auxiliary belt buckle 205 at a desired location along waist belt 3. The arrow R shows the release position and arrow L shows the lock position.

Figure 8:
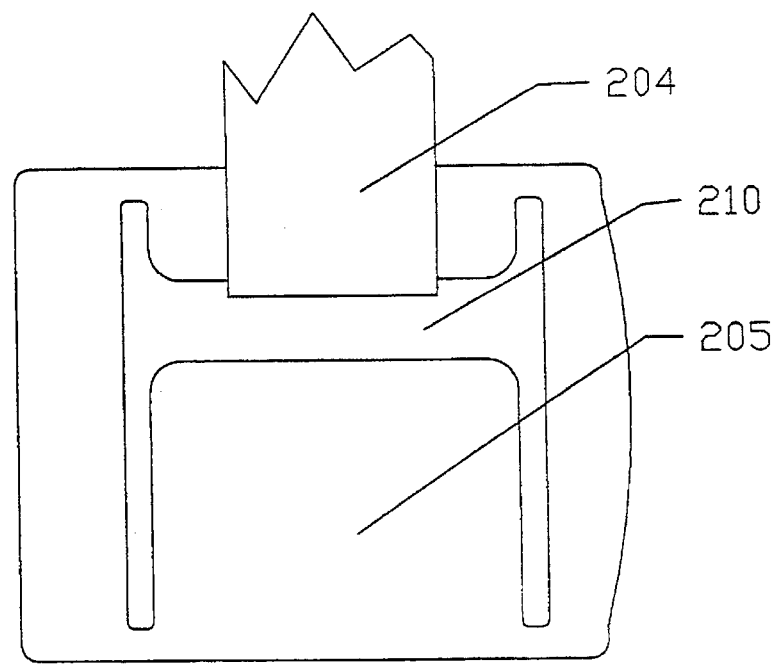
FIG. 8 is a back plan view of the auxiliary belt buckle.
Figure 9:
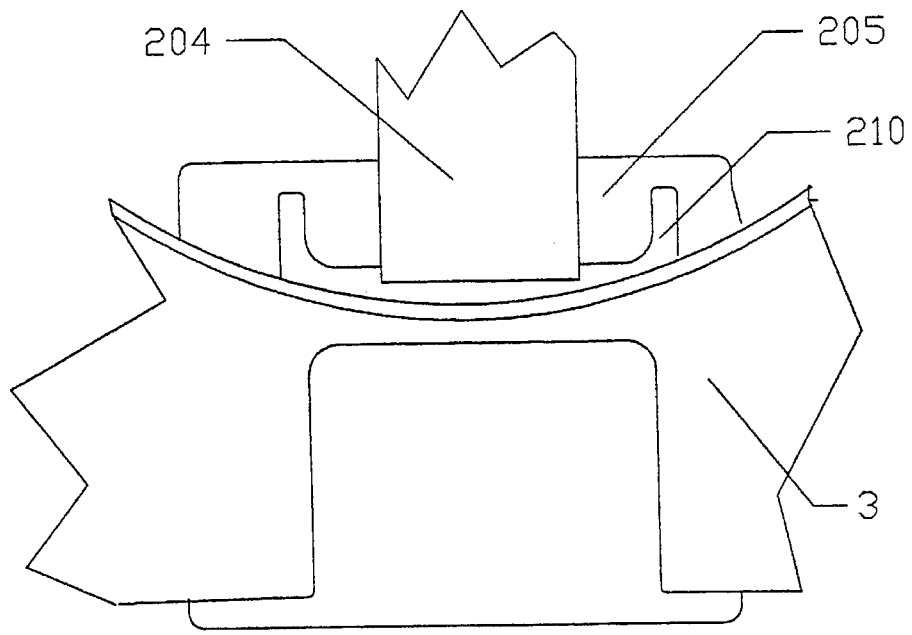
FIG. 9 is the view of FIG. 8 having a lap belt portion of a seat belt partially mounted into the auxiliary belt buckle.
Figure 10:
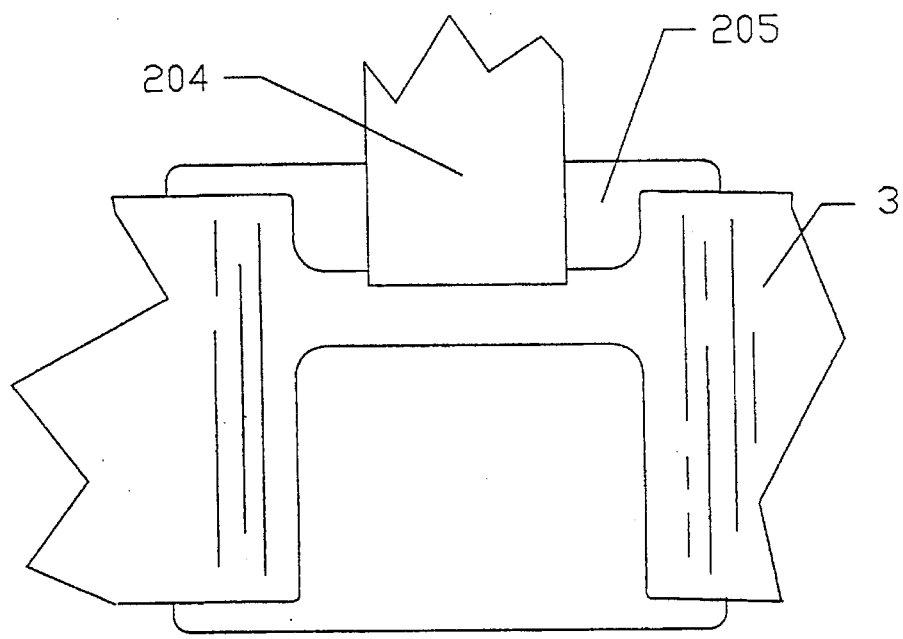
FIG. 10 is the view of FIG. 8 having the lap belt fully mounted into the auxiliary belt buckle.

Referring next to FIGS. 8, 9, 10 the waist belt 3 is shown in sequence as it is mounted to the auxiliary belt buckle 205 as seen from behind.

Figure 11:
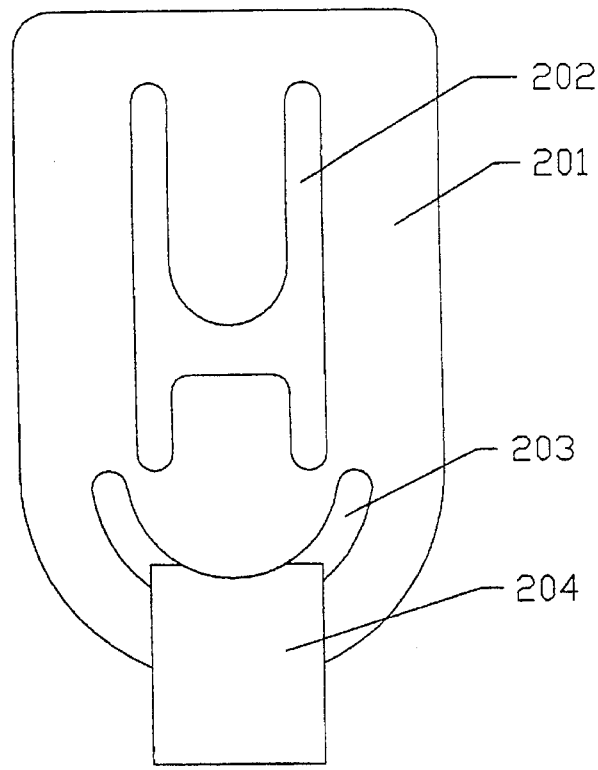
FIG. 11 is a back plan view of the shoulder clip.
Figure 12:
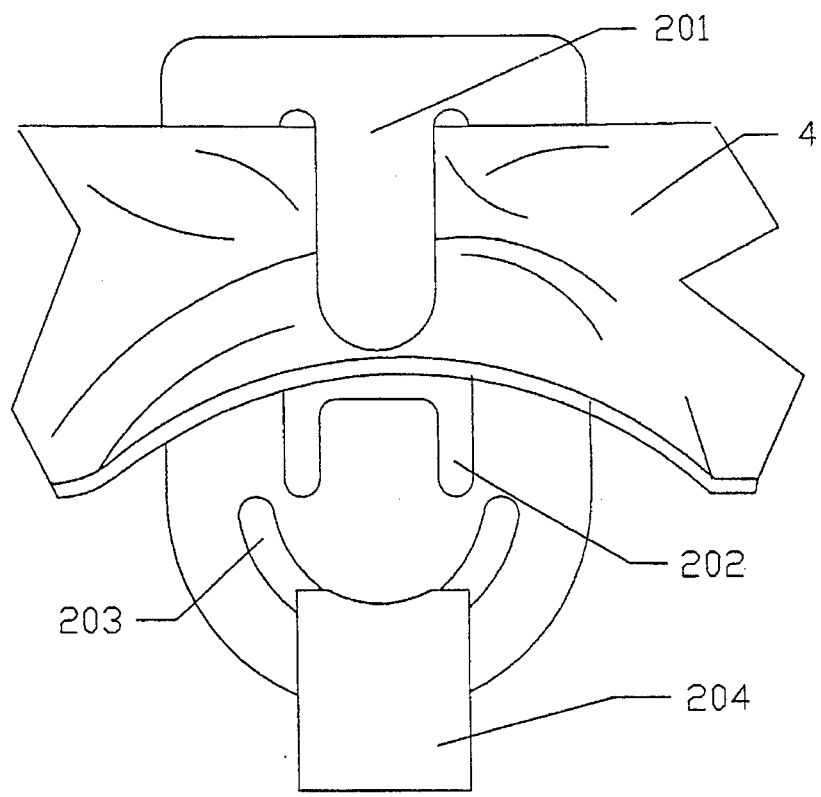
FIG. 12 is the view of FIG. 11 with the shoulder strap partially inserted into the shoulder clip.
Figure 13:
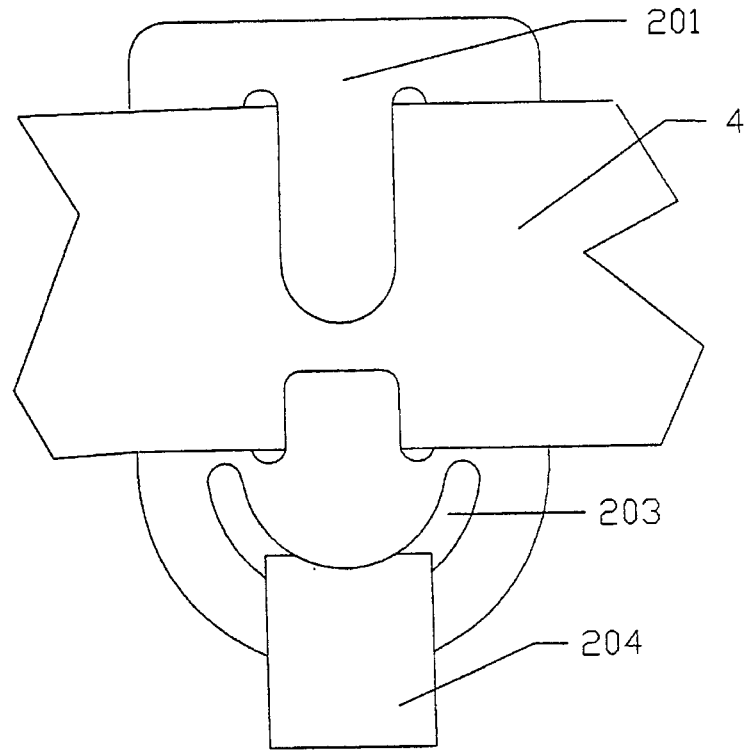
FIG. 13 is the view of FIG. 11 with the shoulder strap fully inserted into the shoulder clip.

Referring next to FIGS. 11, 12, 13 the shoulder belt 4 is shown in sequence as it is mounted to the shoulder clip 202 as seen from behind.

Figure 14:
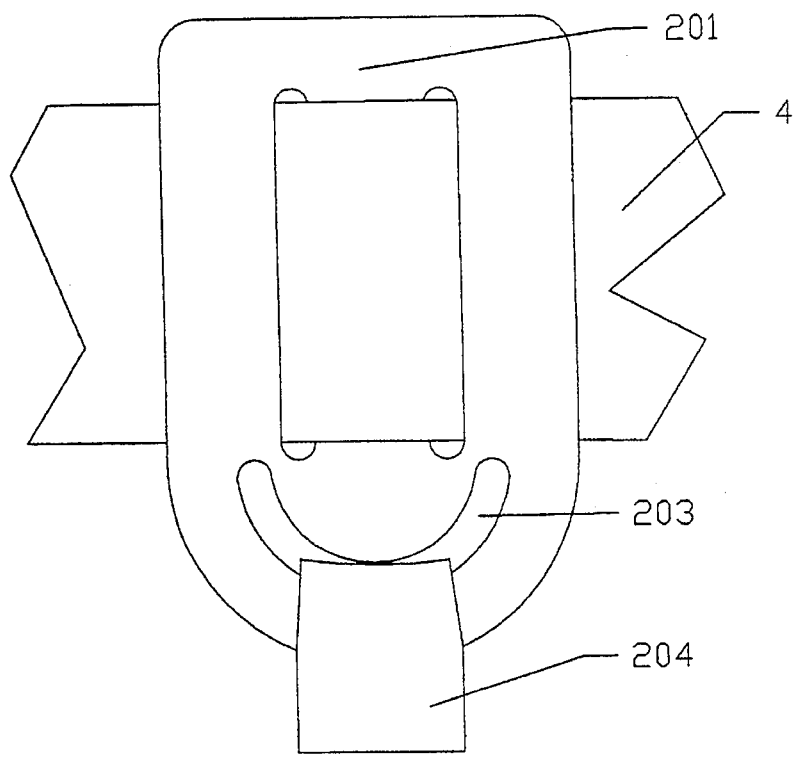
FIG. 14 is a front plan view of the shoulder clip mounted on the shoulder strap.

FIG. 14 shows the front side view of the shoulder clip 201 mounted to the shoulder belt 4.

Although the present invention has been described with reference to preferred embodiments, numerous modifications and variations can be made and still the result will come within the scope of the invention. No limitation with respect to the specific embodiments disclosed herein is intended or should be inferred.

We claim:

1. A seat belt adjuster comprising:

an auxiliary belt buckle affixed to a waist belt;

a shoulder clip affixed to a shoulder strap;

a tether affixing the shoulder clip to the auxiliary belt buckle, thereby allowing the shoulder strap to form a compound angle across a user's upper torso while maintaining the shoulder strap away from a user's face;

said auxiliary belt buckle further comprises a slot and a locking means functioning to lock the auxiliary belt buckle at a desired position along the waist belt;

said locking means further comprises a locking lever having a tongue and the slot further comprises an H-shaped cutout having a receiving groove for the tongue;

said shoulder clip further comprises a slot for the tether, thereby providing adjustment for the shoulder strap;

said tether further comprises a flexible webbing looped through the shoulder clip slot and a rigid attachment to the auxiliary belt buckle; and said shoulder clip consists of an H-shaped cutout for mounting on the shoulder strap, thereby providing for a slidably adjustable position along the shoulder strap with no moving parts.

\* \* \* \* \*